March 16, 1954 — L. WELCH — 2,672,189
CIRCULATING FUEL SYSTEM
Filed June 20, 1950
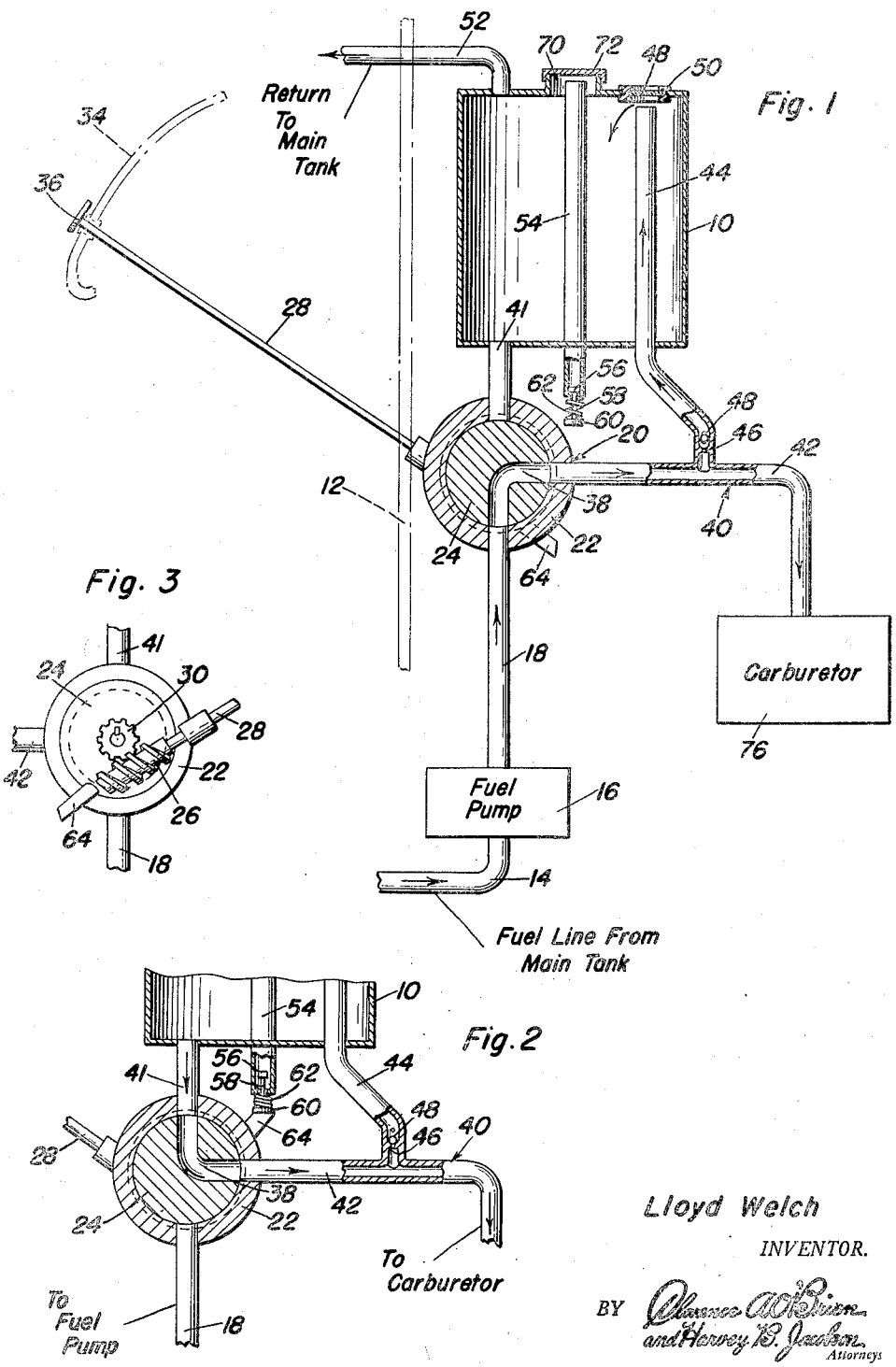
Lloyd Welch
INVENTOR.

Patented Mar. 16, 1954

2,672,189

UNITED STATES PATENT OFFICE 2,672,189

CIRCULATING FUEL SYSTEM

Lloyd Welch, East Hartford, Conn.

Application June 20, 1950, Serial No. 169,091

3 Claims. (Cl. 158—46.5)

This invention relates to improvements in fuel flow systems or assemblies.

An object of this invention is to provide an improved fuel flow system or assembly which has incorporated therewith and as a part thereof an auxiliary tank which connects with a high point in the line from the fuel pump of an engine to the carburetor thereof through the medium of a bleed line so that fuel, vapors and air may be conducted from this line or conductor connecting the fuel pump with the carburetor, hence maintaining the auxiliary tank full of fuel and also bleeding the system of injurious vapor, air or gases.

Another object of this invention is to provide an auxiliary tank of known capacity which is capable of being cut into the fuel line whereby the miles per gallon performance of a vehicle may be accurately checked in a very convenient manner.

A further object of this invention is to provide the auxiliary tank in the assembly in such a manner that fuel will flow therefrom into the carburetor conduit by the pull of gravity thereby avoiding dependence upon the fuel pump. Through this expedient, fuel pump failure is overcome, as is failure of the conducting system, as by a clogged strainer, or a clogged fuel line.

Other objects and features of importance will become apparent in following the description of the illustrated form of the invention.

In the drawings:

Figure 1 is largely a schematic view showing portions of the assembly in section and in elevation and indicating the system as applied to the fuel pump and carburetor of an engine;

Figure 2 is a fragmentary view showing the valve arrangement of Figure 1 but in a different setting, and;

Figure 3 is an end view of the valve illustrating one means of actuating the valve.

In carrying out this invention I have provided an auxiliary fuel tank 10 of a known capacity, for example two gallons, which is adapted to be attached by any suitable means to the firewall 12 of a vehicle or if this is inconvenient to any other suitable component thereof. Ordinary clamps or hangers or brackets are employed in attaching the tank to the vehicle.

The fuel line 14 from the main vehicle tank is shown fragmentarily and has the fuel pump 16 interposed therein. The fuel line 18 leads from the fuel pump and terminates in the fuel control valve 20, said valve including a case 22 with a valve core 24 therein. A worm 26 which is attached to the shaft 28 is enmeshed with a gear 30. The gear 30 is fixed to one end of the core 24 and the shaft 28 is adapted to pass through the dash panel 34 of the vehicle or adapted to be located in a convenient place adjacent the dash panel. A suitable marking panel may be used near the knob 36 on the outer end of the shaft 28 to indicate the valve setting.

Upon rotation of the shaft 28, the valve core 24 is rotated so that the passage 38 therein communicates the line 18 with the conduit generally indicated at 40 and consisting of a first conduit 41 together with a second conduit 42. Upon rotation of the core 24 the passage 38 may connect the first conduit 41 with the second conduit 42 whereby the tank 10 is in communication with the carburetor of the engine inasmuch as the second conduit is passed through an opening in the valve case 22 and opens into the tank 10. The valve is therefore arranged alternatively to connect the fuel pump and the auxiliary tank with the carburetor.

A bleed line 44 is attached to the second conduit 42 and has an orifice 46 therein. A small check valve 48 is disposed on the orifice for control thereof. The upper end of the bleed line 44 is disposed adjacent the top of the tank 10.

A sight panel 49 is disposed in a rubber bushing 50 which is arranged in an opening in the top of the tank. The sight opening panel 49 is removable and replaceable.

A return line 52 is attached to the upper part of the tank 10 and opens thereinto. The return line is connected with the top part of the main fuel tank of the vehicle, whereby overflow fuel from the tank 10 is conducted back to the main tank. Thus, the bleed line 44 is rendered continually operative to relieve excess pressures of fuel, vapor and air that may exist in the pressure line 40 between the fuel pump and the carburetor.

Means forming a vent for the tank 10 is supplied. This means consists of a vertical tube 54 which is passed through an opening in the bottom of the tank and which has a valve 56 with a stem 58 extending therefrom, disposed in the lower end thereof. A plate 60 is fixed to the bottom end of the stem 58 and serves two purposes. The first purpose is to form a seat for the spring 62 which reacts on the lower end of the tube 54 and the second is to provide a surface upon which the arm 64 is adapted to seat. The spring 58 constantly urges the valve 56 in the valve closing condition, while when the valve core 24 is operated, the arm 64 which is fixed thereto, strikes the plate 60 actuating the valve 56 against the opposition or opposing force of the spring 58.

Therefore, when the valve core is in such a setting that the passage 38 connects the first conduit 41 with the second conduit 42, the arm 64 presses the valve for the vent to the open condition allowing air to enter into the dome 70 which is formed at the upper end of the tank 10. This dome is made of a collar which forms a neck to support the cap 72. The dome also provides a means of filling the auxiliary tank 10 as found desirable or necessary.

In operation, fuel drawn through the fuel line 14 from the main tank by the fuel pump 16 is directed through the fuel line 18 and conductor 42 for ultimate use in the carburetor 76. During this time and while the valve is in the position as disclosed in Figure 1, some fuel will be bled through the line 44. The place at which the bleeder line 44 connects with the conduit 42 is chosen at a high elevation. Accordingly the vapors and air which may be in the fuel pump or lines are drawn therefrom for deposit in the tank 10.

When the tank 10 has been filled to capacity, the overflow or excess fluids such as fuel, vapor and air will be conducted through the return line 52 to the main tank of the vehicle. The arrangement of parts herein provides for a continual drawing off of excess fuel from the auxiliary tank to be returned to the main supply tank. Since the fuel pump delivers fuel through line 49 under pressure, excess fuel bleeds off under pressure through line 44. After auxiliary tank 10 becomes filled, any further fuel delivered under pressure through line 44 is forced under pressure through line 52 to flow into the main fuel supply tank.

If for one reason or another it is desired to use the fuel in the tank 10, the valve is arranged as disclosed in Figure 2, by means of the manually operable shaft 28 or some other conventional control means. At this time, the line 18 is closed by the core whereby the fuel pump will no longer deliver fuel to the carburetor of the engine. However, the passage 38 will connect the first conduit 41 with the second conduit 42 for fuel flow due to gravity. This empties the fuel from the tank 10 through the conduit 40, which consists specifically of the first conduit 41 and the second conduit 42.

But, this fuel flow would not be possible at least, it would not be possible to operate efficiently unless there was some way to vent the tank 10. Hence, at the time that the valve core 24 is operated so that the passage 38 connects the first conduit 41 with the second conduit 42, the arm 64 presses against the vent valve, opening it to allow air to enter into the dome or pressure chamber 70. It will be noted that the fuel system described herein is characterized by an arrangement of elements providing for a continual drawing off of deleterious vapors and gases from the carburetor supply line thereby preventing the phenomenon known as "vapor lock," which often renders the carburetor inoperative or inefficient. By means of a continual bleed, these vapors and gases, which may be generated by a fuel pump, for example, are continually drawn off through an auxiliary tank which is simultaneously filled and kept filled with fuel. Thus, the bleed system, having the double function of drawing off such gases and vapors while filling an auxiliary fuel tank, is made possible by the provision of a return line from the auxiliary tank to the main fuel supply tank, said return line continually drawing off excess fluids, such as fuel, vapor or air from the auxiliary tank. The arrangement of parts herein also provides a conduit connecting the main tank directly with the carburetor, said conduit including a pump which is operative to feed fuel under pressure directly to the carburetor while the auxiliary fuel tank is wholly laterally disposed relative to the conduit with the bleed means positioned in the conduit between the pump and the carburetor and leading into the auxiliary tank to draw fuel, vapor and air from the conduit into the auxiliary tank.

Having described the invention, what is claimed as new is:

1. A fuel flow system for a vehicle engine comprising a main fuel supply tank, a carburetor, a fuel supply line connected directly between said main tank and said carburetor, an auxiliary fuel tank connectible through said supply line to said carburetor, a bleed line from said supply line to said auxiliary tank to conduct fuel, vapor and air from said supply line to said auxiliary tank and to supply said auxiliary tank with fuel, a return line connected between said auxiliary tank and said main tank to conduct overflow fluids from said auxiliary tank to said main tank, a fuel valve connected between said auxiliary tank and said carburetor, a vent valve in said auxiliary tank, said vent valve being operable by said fuel valve when the latter is actuated to permit fuel to flow from said auxiliary tank to said carburetor.

2. A fuel flow system for a vehicle engine comprising a main fuel supply tank, a carburetor, pump means, conduit means including said pump means connecting directly said main tank and said carburetor whereby said pump means is operative to feed fuel under pressure directly to said carburetor, an auxiliary fuel tank wholly laterally disposed relative to said conduit means, bleed means in the conduit means between said pump means and said carburetor and leading into said auxiliary tank, to draw fuel, vapor and air from said conduit means into said auxiliary tank, means connected directly between said auxiliary tank and said main tank and operative to continually relieve pressures of fuel, vapor and air building up in said auxiliary tank whereby the bleed means is rendered continually operative to relieve pressures of fuel, vapor and air building up in the conduit means between said pump means and said carburetor, and means connecting said carburetor alternatively with said pump means and said auxiliary tank.

3. A fuel flow system for a vehicle engine comprising a main fuel supply tank, a carburetor, a fuel pump connected between said supply tank and said carburetor, an auxiliary fuel tank, a fuel valve connecting said carburetor alternatively with said fuel pump and said auxiliary tank, a bleed line connected between said auxiliary tank and said carburetor and operative when said valve connects said pump and said carburetor to conduct fuel, vapor and air from the system between said pump and carburetor to said auxiliary tank and to supply said auxiliary tank with fuel, a return line connected between said auxiliary tank and said main tank to conduct overflow fuel, vapor and air to said main tank, thereby permitting said bleed line to be continually operative when said fuel pump is connected with said carburetor, and a vent valve in said auxiliary tank and means connected to said fuel valve to operate said vent valve when said fuel valve is set to permit fuel to flow from said auxiliary tank to said carburetor.

LLOYD WELCH.

References Cited in the file of this patent

UNITED STATES PATENTS

| Number | Name | Date |
|---|---|---|
| 1,523,370 | Skaggs | Jan. 13, 1925 |
| 1,662,614 | Mandolini | Mar. 13, 1928 |
| 1,829,277 | Haase et al. | Oct. 27, 1931 |

FOREIGN PATENTS

| Number | Country | Date |
|---|---|---|
| 438,854 | Germany | Dec. 28, 1926 |